United States Patent
Redkina et al.

(10) Patent No.: US 10,810,262 B2
(45) Date of Patent: Oct. 20, 2020

(54) SYSTEM AND METHOD FOR DASHBOARD SELECTION

(71) Applicant: ServiceNow, Inc., Santa Clara, CA (US)

(72) Inventors: Olga Redkina, Amsterdam (NL); Vishal Narkhede, Amsterdam (NL); Mihai Pricope, Amsterdam (NL); Aida Rikovic Tabak, Amsterdam (NL)

(73) Assignee: ServiceNow, Inc., Santa Clara, CA (US)

( * ) Notice: Subject to any disclaimer, the term of this patent is extended or adjusted under 35 U.S.C. 154(b) by 0 days.

(21) Appl. No.: 16/133,367

(22) Filed: Sep. 17, 2018

(65) Prior Publication Data
US 2020/0089818 A1 Mar. 19, 2020

(51) Int. Cl.
*G06F 16/335* (2019.01)
*G06F 16/34* (2019.01)
*G06F 16/904* (2019.01)
*G06F 3/0484* (2013.01)

(52) U.S. Cl.
CPC ........ *G06F 16/904* (2019.01); *G06F 3/04842* (2013.01); *G06F 16/335* (2019.01); *G06F 16/345* (2019.01)

(58) Field of Classification Search
CPC ............................. G06F 3/04842; G06F 16/345
See application file for complete search history.

(56) References Cited

U.S. PATENT DOCUMENTS

| | | |
|---|---|---|
| 6,321,229 B1 | 11/2001 | Goldman |
| 6,609,122 B1 | 8/2003 | Ensor |
| 6,816,898 B1 | 11/2004 | Scarpelli |
| 7,028,301 B2 | 4/2006 | Ding |
| 7,062,683 B2 | 6/2006 | Warpenburg |
| 7,131,037 B1 | 10/2006 | LeFaive |
| 7,170,864 B2 | 1/2007 | Matharu |
| 7,350,209 B2 | 3/2008 | Shum |
| 7,610,512 B2 | 10/2009 | Gerber |
| 7,617,073 B2 | 11/2009 | Trinon |
| 7,890,802 B2 | 2/2011 | Gerber |
| 7,930,396 B2 | 4/2011 | Trinon |
| 7,945,860 B2 | 5/2011 | Vambenepe |
| 7,966,398 B2 | 6/2011 | Wiles |
| 8,051,164 B2 | 11/2011 | Peuter |
| 8,151,261 B2 | 4/2012 | Sirota |
| 8,224,683 B2 | 7/2012 | Manos |

(Continued)

*Primary Examiner* — Scott T Baderman
*Assistant Examiner* — Mario M Velez-Lopez
(74) *Attorney, Agent, or Firm* — Fletcher Yoder PC

(57) ABSTRACT

One or more client instances hosted by a platform may support access to a cloud-based application to select a dashboard, such as via a client device. Each dashboard includes one or more visualizations of analytic or summary information. When a user of the client device accesses the cloud-based application, a subset of dashboards are initially provided based on recent usage history of dashboards. Specifically, the cloud-based application determines if the user has access to each dashboard of the subset of dashboards and, in response to determining the user does have access to a dashboard, displays the dashboard within the subset of dashboards. The user may select a dashboard from the subset of dashboards, where the selected dashboard is displayed on the client device.

19 Claims, 9 Drawing Sheets

(56) References Cited

U.S. PATENT DOCUMENTS

| | | | |
|---|---|---|---|
| 8,266,096 B2 | 9/2012 | Navarrete | |
| 8,457,928 B2 | 6/2013 | Dang | |
| 8,478,569 B2 | 7/2013 | Scarpelli | |
| 8,646,093 B2 | 2/2014 | Myers | |
| 8,674,992 B2 | 3/2014 | Poston | |
| 8,689,241 B2 | 4/2014 | Naik | |
| 8,743,121 B2 | 6/2014 | De Peuter | |
| 8,887,133 B2 | 11/2014 | Behnia | |
| 9,239,857 B2 | 1/2016 | Trinon | |
| 9,535,737 B2 | 1/2017 | Joy | |
| 9,557,969 B2 | 1/2017 | Sharma | |
| 9,792,387 B2 | 10/2017 | George | |
| 9,819,729 B2 | 11/2017 | Moon | |
| 10,121,026 B1 * | 11/2018 | Ryland | H05K 7/1498 |
| 10,216,621 B1 * | 2/2019 | Rutten | G06F 16/2455 |
| 10,228,837 B2 * | 3/2019 | Hua | G06F 3/04847 |
| 10,262,048 B1 * | 4/2019 | Cappiello | G06F 16/2393 |
| 10,409,367 B2 * | 9/2019 | Velez-Rojas | G06Q 10/101 |
| 2011/0302221 A1 * | 12/2011 | Tobin | G06F 16/24575 |
| | | | 707/805 |
| 2012/0069131 A1 * | 3/2012 | Abelow | G06Q 10/067 |
| | | | 348/14.01 |
| 2012/0109984 A1 * | 5/2012 | Clark, Jr. | G06F 16/248 |
| | | | 707/754 |
| 2014/0337778 A1 * | 11/2014 | Armitage | G06F 3/0484 |
| | | | 715/771 |
| 2015/0199114 A1 * | 7/2015 | Louch | G06F 3/04817 |
| | | | 715/765 |
| 2017/0034300 A1 * | 2/2017 | George | H04L 67/02 |
| 2017/0075919 A1 * | 3/2017 | Bose | G06F 21/6245 |
| 2017/0134381 A1 * | 5/2017 | Abdelhamed | H04L 63/10 |
| 2017/0235436 A1 * | 8/2017 | Hooton | G06F 3/0486 |
| | | | 705/7.11 |

* cited by examiner

SYSTEM AND METHOD FOR DASHBOARD SELECTION

BACKGROUND

The present disclosure relates generally to user interface improvements and more specifically, to facilitating selection of a dashboard for presenting visual information.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Cloud-based applications may be implemented using virtual server instance or instantiation accessible via a public or private cloud network, which may be colloquially referenced as instances. To simplify user interaction with a given application on the instance (or in other computing contexts), a client device may use display information on a dashboard which may be customized to display or summarize particular information that may be relevant to a task or user. However, for a given user who works in multiple applications and/or performs multiple tasks, selection and/or display of an appropriate dashboard from among a multitude may be problematic.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The disclosed subject matter relates to client instances that support access to a cloud-based application to select a dashboard, such as via a client device. When a user of the client device accesses the cloud-based application, a subset of available dashboards are initially provided. For example, the cloud-based application may determine if the user has access to each dashboard of a subset of dashboards and, in response to determining the user does have access to a dashboard, displays the dashboard on the client device. The subset of dashboards may be based on recent usage by the user, in which a limited number of recently used dashboards are determined and utilized as the subset. In this manner, less time may be consumed relative to providing all available dashboards. Additionally, the user may use the cloud-based application to navigate and/or browse available dashboards for selection. For example, the user may search for particular dashboards via text input and the cloud-based application may determine the subset of dashboard(s) based on the search. In any case, the user may select a dashboard from the subset of dashboards and the selected dashboard may be displayed on the client device.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

Figure 1:
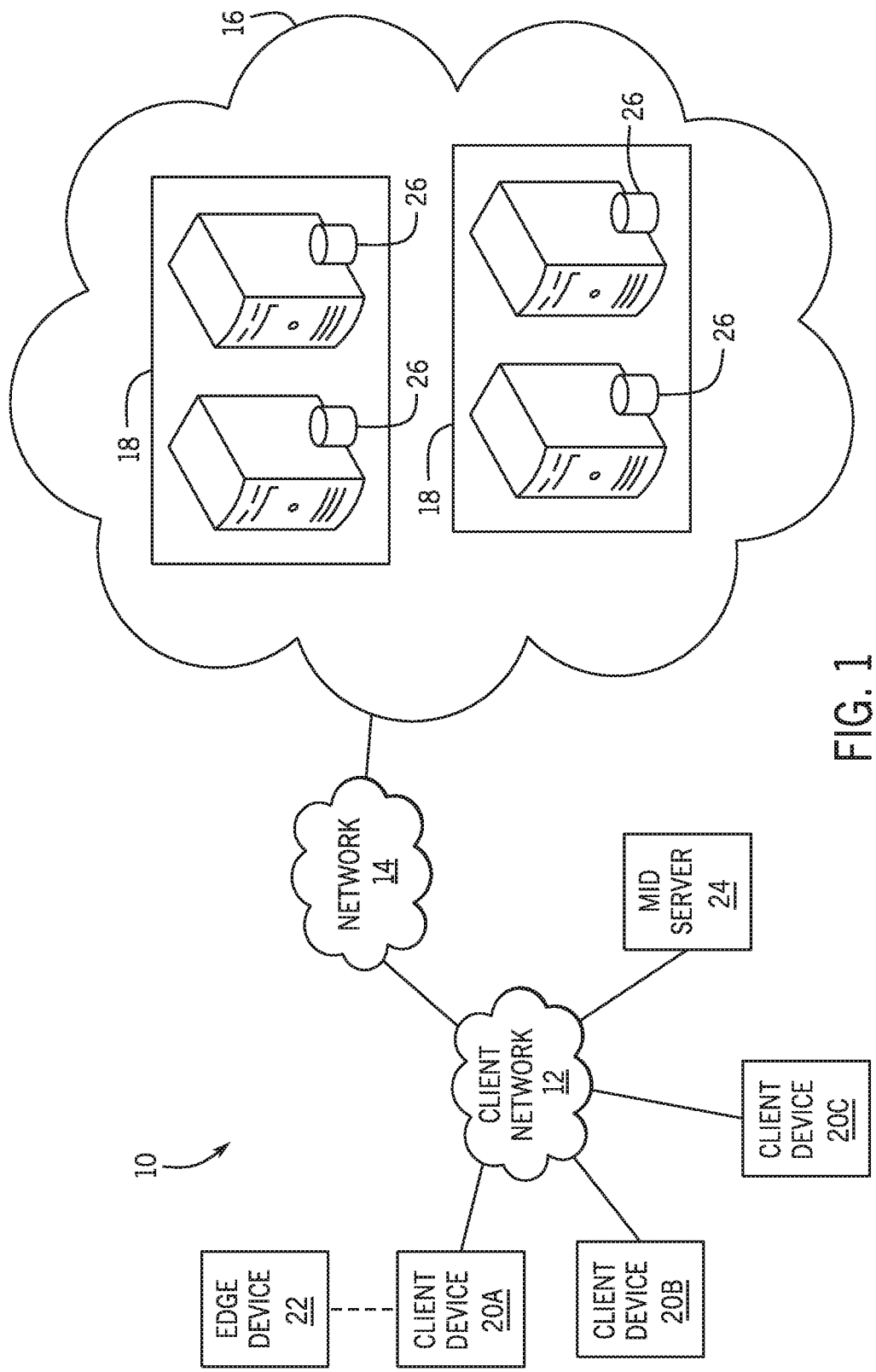
FIG. 1 is a block diagram of an embodiment of a cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As used herein, a "dashboard" refers to a configured visual display of summary and/or analytic (e.g., statistical analysis) information that is typically task- or application-specific and which may be configured or laid out based on user or organizational preferences. For example, a dashboard may be configured based on a user or organizational preference or in view of a particular task such that the display of the respective dashboard information supports performing the task or analyzing data relevant to the task. A dashboard may include a graphical user interface (GUI) that enables a user of the dashboard to review or interact with the information, such as via application modules or applets (e.g., widgets), including performing a manipulation of a display of the information. Thus, a dashboard may provide a pre-configured or designed overview of summary or analytic information to enable a user to visualize and/or analyze task- or application-specific information efficiently.

As discussed herein, cloud-based applications may be used to perform various functions of an organization or enterprise. For individuals using such applications, various dashboards may be provided to help visualize information (e.g., data and reports). For example, for a given application, a user (or group of users, such as a department within the organization) may develop various dashboards that convey or summarize information they frequently wish to review or reference (such as data frequently reference based on personal or departmental preferences), dashboards that convey information relevant to particular tasks and/or reports, dashboards that relate to exception handling or incidents corresponding to an issue or problem to be resolved, and so forth. Thus, a given user may have a multitude of dashboards available to access, including dashboards designed by the user based on their preferences, dashboards available to all members of a department or organization the user is a member of, dashboards specific to tasks performed by the users or reports prepared by the users, and so forth. Further, this number of dashboards available to a user may grow over time. Thus, for a given user, there may be a collection of available dashboards, where different dashboards of the collection of dashboards may be used to display different types of data and/or to display data in a different format. As an example, a particular dashboard may display information associated with reported IT-related incidents and may use multiple graphs to illustrate the information. Another dashboard may display information associated with data collection and may use multiple tables to display values associated with data collection information. As discussed herein, an application, such as a cloud-based application running on a client-instance, may be implemented so as to enable a user to select a particular dashboard from among a number of dashboards to view information.

A certain amount of resources may be consumed to provide each dashboard. As an example, providing a dashboard may include determining if a dashboard is accessible to a user and, in response to determining that the dashboard is accessible, displaying the dashboard to the user. That is, a user may have access to a portion of the collection of dashboards. In other words, certain dashboards may be accessible to the user, while other dashboards are not accessible to the user. For example, the user may not be able view a particular type of information and thus, the user may not access dashboards associated with the type of information. As should be appreciated, the time to determine accessibility of all dashboards and providing all dashboards increases as the number of dashboards available to the user increases, which may delay, lag, or otherwise hinder the user to view available dashboards. Furthermore, listing (e.g., displaying) all dashboards may be problematic for the user to navigate the provided dashboards, which may further increase an amount of time spent by the user to select a desired dashboard. However, providing a subset of dashboards may reduce an amount of time to display the dashboards and/or for the user to select a desired dashboard. For example, when the user accesses the application, the application may list recently used dashboards by default (e.g., upon initiation), and the cloud-based application may also provide an option to the user to list all available dashboards (or a larger subset of dashboards) if desired.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a computing system 10, such as a cloud computing system, where embodiments of the present disclosure may operate, is illustrated. The computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
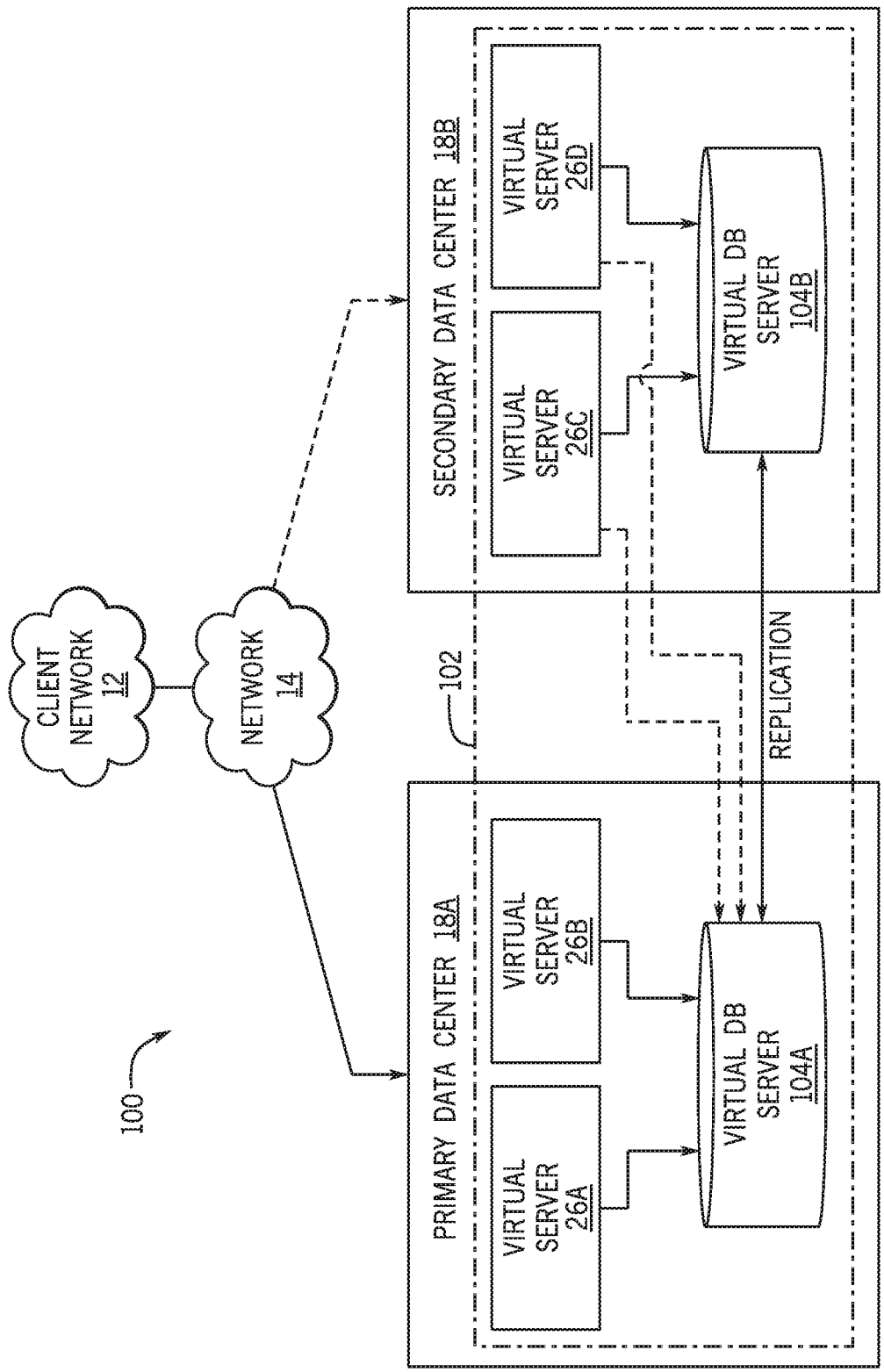
FIG. 2 is a schematic diagram of an embodiment of a multi-instance cloud architecture in which embodiments of the present disclosure may operate.

FIG. 2 is a schematic diagram of an embodiment of a multi-instance cloud architecture 40 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers 26 (e.g., virtual servers 26A, 26B, 26C, and 26D) and dedicated database servers (e.g., virtual database servers 104A and 104B). Stated another way, the virtual servers 26A, 26B, 26C, 26D and virtual database servers 104A, 104B are not shared with other client instances but are specific to the respective client instance 102. Other embodiments of the multi-instance cloud architecture 100 could include other types of dedicated virtual servers, such as a web server. For example, the client instance 102 could be associated with (e.g., supported and enabled by) the dedicated virtual servers 26A, 26B, 26C, 26D, dedicated virtual database servers 104A, 104B, and additional dedicated virtual web servers (not shown in FIG. 2).

In the depicted example, to facilitate availability of the client instance 102, the virtual servers 26A, 26B, 26C, 26D and virtual database servers 104A, 104B are allocated to two different data centers 18A, 18B, where one of the data centers 18 acts as a backup data center 18. In reference to FIG. 2, data center 18A acts as a primary data center 18A that includes a primary pair of virtual servers 26A, 26B and the primary virtual database server 104A associated with the client instance 102, and data center 18B acts as a secondary data center 18B to back up the primary data center 18A for the client instance 102. To back up the primary data center 18A for the client instance 102, the secondary data center 18B includes a secondary pair of virtual servers 26C, 26D and a secondary virtual database server 104B. The primary virtual database server 104A is able to replicate data to the secondary virtual database server 104B (e.g., via the network 14).

As shown in FIG. 2, the primary virtual database server 104A may backup data to the secondary virtual database server 104B using a database replication operation. The replication of data between virtual database servers 104 could be implemented by performing full backups weekly and daily incremental backups in both data centers 18A, 18B. Having both a primary data center 18A and secondary data center 18B allows data traffic that typically travels to the primary data center 18A for the client instance 102 to be diverted to the second data center 18B during a failure and/or maintenance scenario. Using FIG. 2 as an example, if the virtual servers 26A, 26B and/or primary virtual database server 104A fails and/or is under maintenance, data traffic for client instances 102 can be diverted to the secondary virtual servers 26C, 26D and the secondary virtual database server instance 104B for processing.

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
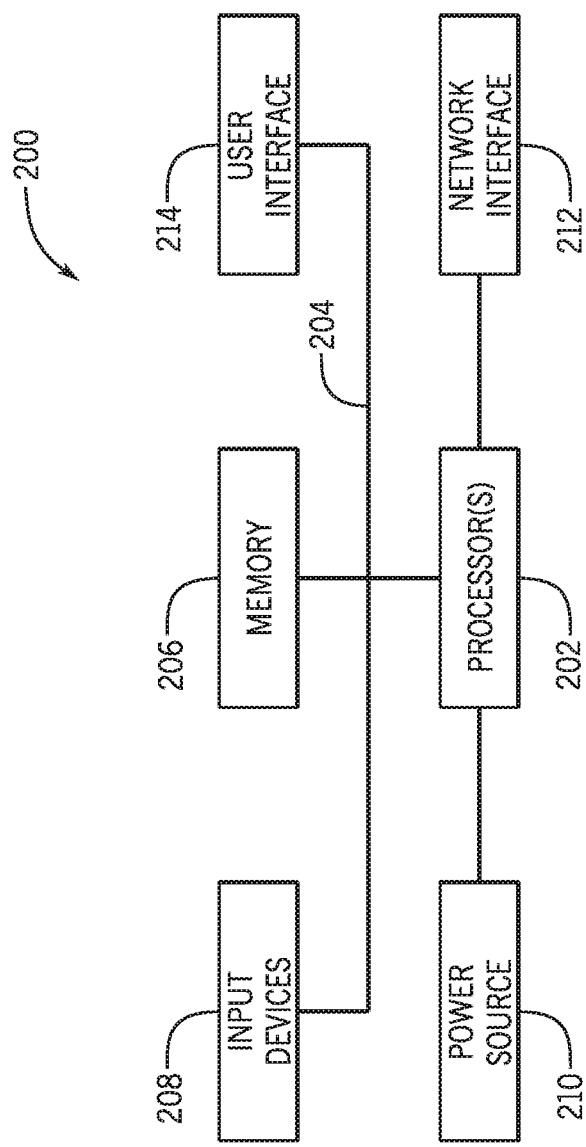
FIG. 3 is a block diagram of a computing device utilized in a computing system that may be present in FIG. 1 or 2 in accordance with aspects of the present disclosure.

With this in mind, and by way of background, it may be appreciated that the present approach may be implemented using one or more processor-based systems such as shown in FIG. 3. Likewise, applications and/or databases utilized in the present approach stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3 may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard, and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
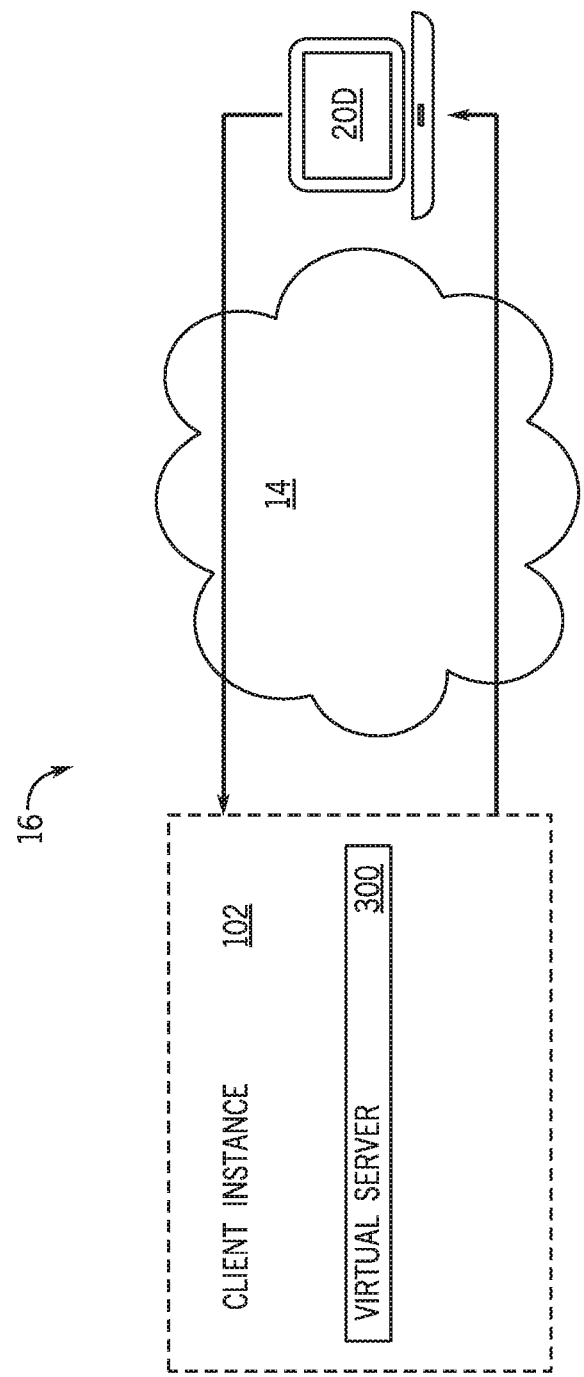
FIG. 4 is a block diagram illustrating an embodiment in which a virtual server supports and enables the client instance, in accordance with aspects of the present disclosure.

With the foregoing in mind, FIG. 4 is a block diagram illustrating an embodiment in which a virtual server 300 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20D via the network 14 to provide a user interface to network applications executing within the client instance 102 (e.g., via a web browser of the client device 20D). Client instance 102 is supported by physical servers or virtual servers 26 similar to those described with respect to FIG. 2, and is illustrated here to show support for the disclosed functionality described herein within the client instance 102. Cloud provider infrastructures are generally configured to support a plurality of end-user devices, such as client device 20D, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

The client instance 102 may support the client device 20 to access a cloud-based application via the network 14 and for which information is visually displayed on the client device. The information may be presented on one or more dashboards viewable on the client device 20 by a user. As discussed herein, the user may view and/or select a particular dashboard to present select or task-specific information. For example, the user may desire to select a particular dashboard to present a certain information type and/or to present information in a certain format or layout. The cloud-based application may provide available dashboards via a GUI displayed on the client device 20. As used herein, a GUI may refer to any graphical interface that includes visual indicators, such as icons, symbols, images, which a user may interact with to perform an action associated with the cloud-based application. In this disclosure, the GUI may enable the user to view and/or select available dashboards to display on the client device 20D.

Figure 5:
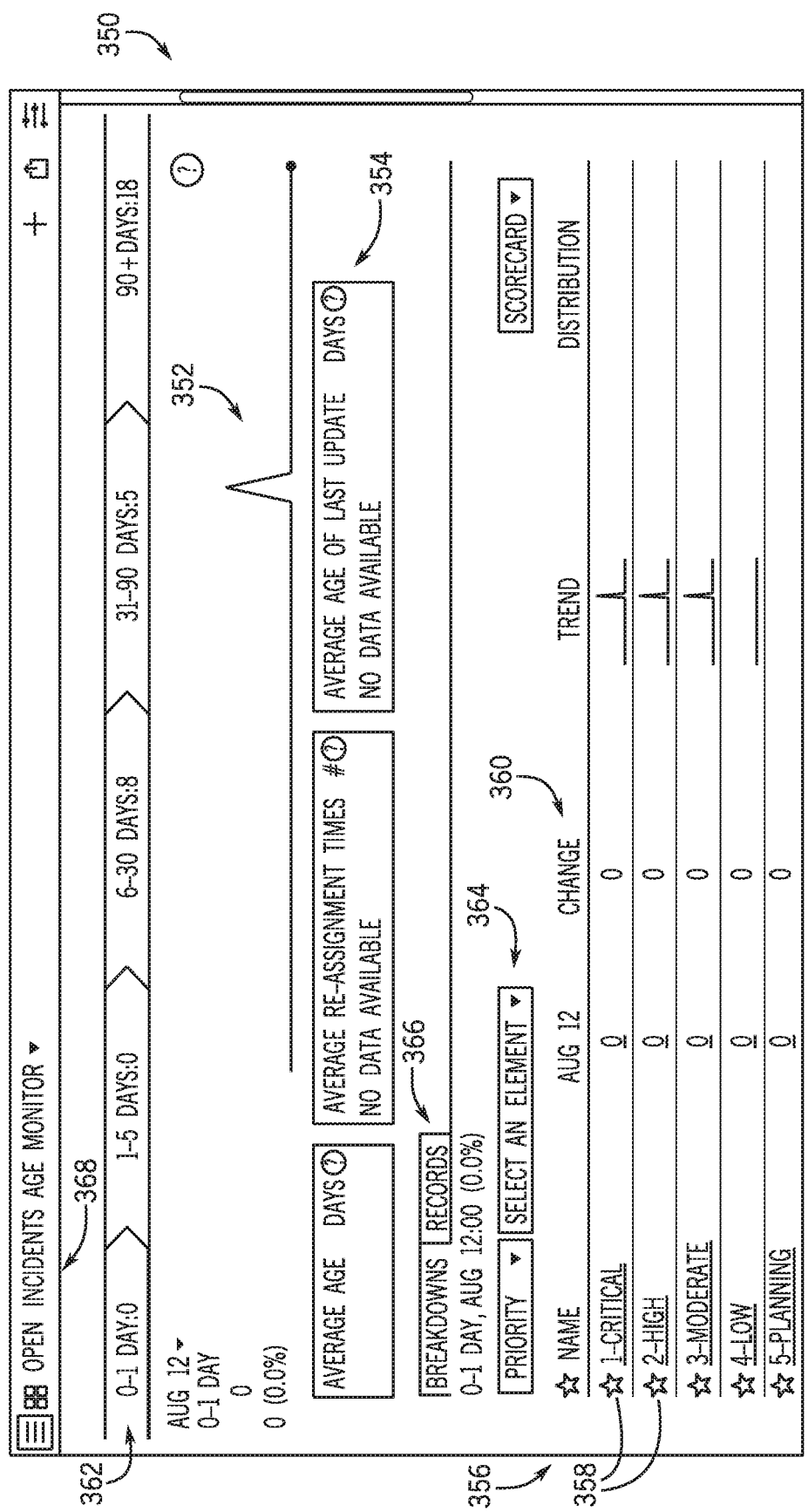
FIG. 5 is an embodiment of a dashboard that may be used to display information, in accordance with aspects of the present disclosure.

FIG. 5 depicts an example of a dashboard 350 that may be used to display information, such as on any of a client device 20. As previously described, a dashboard 350, as used herein, typically refers to a visual presentation of task-specific or otherwise selected summary and/or analytic information and the dashboard 350 may include elements (such as widgets, graphs, charts, tables, summary panes, counters, timers, and so forth) to present the information. In the illustrated embodiment, the dashboard 350 is implemented to display information regarding open incidents via graphs and tables, though it should be appreciated that other methods may be implemented to present information, such as via lists, charts, and so forth. In the illustrated embodiment, the dashboard 350 may include an overview graph 352 that may display information regarding a total collection of data, such as a total number of open incidents over a period of time. Multiple information icons 354 may be positioned adjacent to the overview graph 352, where each information icon 354 may include general information associated with the incidents, such as an average age of the open incidents, an average assignment time of the open incidents, and so forth.

In the depicted example, the dashboard 350 also includes a table 356 that may break down the overview graph 352 into subset categories, for example. In other words, the table 356 may include different types of open incidents, such as open incidents of different priorities. Each type of open incident may be separated into rows 358 on the table 356, where each row 358 includes multiple fields 360 that each includes information regarding the particular type of open incident. As an example, the fields 360 may include an average age of the type of open incident, a daily change in the number of the particular type of open incident, and/or a graph of the number of the particular type of open incident over a period of time. In this manner, the overview graph 352 and the table 356 of the dashboard 350 summarizes information. In general, a user may use element of the dashboard 350 to visualize multiple items of information regarding open incidents quickly and efficiently.

In some embodiments, a user may also perform certain functions on the dashboard 350. For example, the user may adjust the display of the overview graph 352. To this end, the dashboard 350 may include graph icons 362 that the user may select to adjust a range (e.g., the period of time) displayed in the overview graph 352. The user may also select different information icons 354 displayed to view different information regarding the total number of incidents. The user may also adjust the display of the table 356. By way of example, the table 356 may include table icons 364 that may enable the user to select a different subset category of open incidents to be displayed and/or different fields 360 to be displayed. In certain embodiments, the user may also select display icons 366 that enable information to be displayed differently. For example, the user may select the display icons 366 to display information regarding the total collection of data via a different type of graph (e.g., bar graph, scatterplot) and/or to display information regarding the subsets of the collection of data via a chart instead of the table 356.

As will be appreciated by the preceding example, a dashboard 350, in a more general context, can help provide a user with summary or task-specific information relevant to specific needs so as to allow the user to more efficiently perform a task. As may be further appreciated, the content and display of a dashboard 350 may vary greatly based on context and may be personalized at either the individual or group (i.e., department) level. Further, as discussed herein, a multitude of such dashboards 350 may be available to a user as the proliferation of such dashboards 350, though helpful in one sense, may create a new issue of having to manage and navigate to the dashboard that is needed in a given context from among a number of available dashboards.

With this in mind, the dashboard 350 may include dashboard icons 368 to enable the user to select the type of dashboard 350 to be displayed. In general, different dashboards 350 may be used to display information in a different visual presentation. In other words, dashboards 350 may be selected to display information associated with the open incidents in various formats (e.g., different layout of visual presentations, different images, different types of graphs, charts, and/or tables). Dashboards 350 may also be used to display another type of information. In other words, a different dashboard 350 may be selected to display closed incidents, to display open problems, or both. Therefore, the user may desire to select a different dashboard to visualize information in different formats and/or to visualize other types of information.

Figure 6:
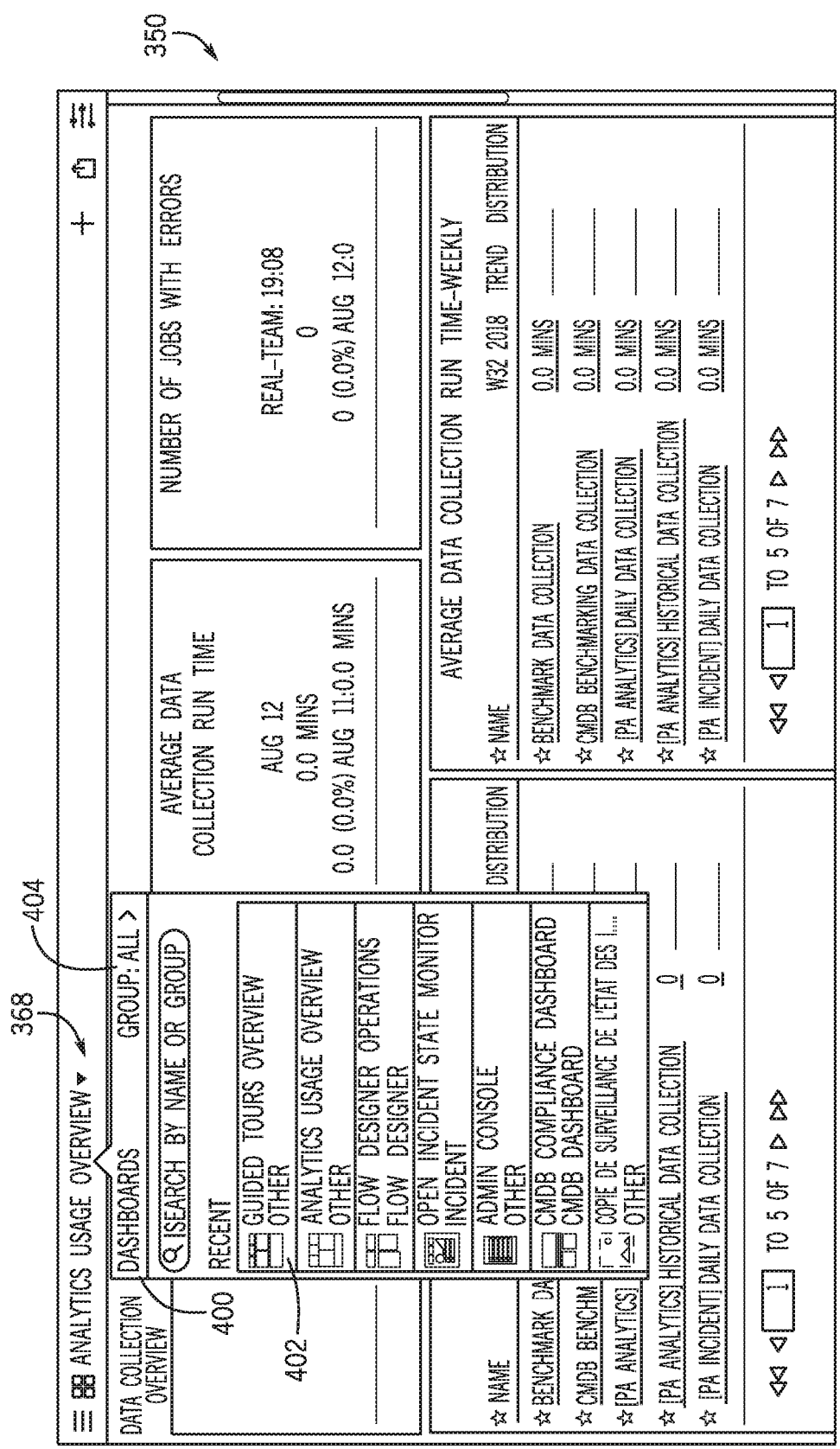
FIG. 6 is an embodiment of a graphical user interface (GUI) that may be used to select a dashboard, in accordance with aspects of the present disclosure.

FIG. 6 illustrates an embodiment of the dashboard 350 that includes a dashboard selection GUI 400 that may be used to select a different dashboard 350 to be displayed. As an example, the dashboard selection GUI 400 may be initiated when one of the dashboard icons 368 is selected. In the illustrated embodiment, the dashboard selection GUI 400 is overlaid on the dashboard 350 (e.g., as a drop down menu), enabling the user to view the dashboard selection GUI 400 without closing out of the dashboard 350. The user may be able to adjust a size of the dashboard selection GUI 400 and/or to navigate (e.g., scroll) through the dashboard selection GUI 400 to view available dashboards 350. Available dashboards 350 displayed on the dashboard selection GUI 400 may each be displayed as a dashboard descriptor 402. Each dashboard descriptor 402 may include certain information associated with the respective dashboards 350 to enable the user to identify the dashboard 350. In particular embodiments, each dashboard descriptor 402 may include a name of the dashboard 350, an image of the dashboard 350, an information type (e.g., open incidents) of the dashboard 350, and the like.

When open, the dashboard selection GUI 400 may, by default, list a particular number (e.g., 5, 10, 15, 20) of dashboard descriptors 402, each corresponding to an available dashboard 350, available to the user for selection, such as based on a particular category of dashboards 350. As depicted in FIG. 6, the dashboard selection GUI 400 may list recently used dashboards 350. In other words, the dashboard selection GUI 400 may list dashboard descriptors 402 corresponding to the most recently displayed dashboards for the user. However, it should be understood that the dashboard selection GUI 400 may list dashboard descriptors 402 corresponding to different factors, such as dashboards 350 that are most frequently selected by the user, dashboards frequently viewed at a given time in a fiscal or product development cycle, and so forth. In any case, by displaying a limited number of dashboard descriptors 402 to select from, the dashboard selection GUI 400 may enable a user to select a dashboard 350 based on a dashboard descriptor 402 without listing all dashboards 350. In other words, instead of listing all available dashboards 350 available to the user on the dashboard selection GUI 400, a subset of dashboards 350 are selected and listed upon initiation of the dashboard selection GUI 400. Particularly, listing the subset of dashboards 350 that the user is most likely to want to use may enable the user to more easily navigate the dashboard selection GUI 400 to select a desired dashboard 350.

In certain embodiments, there may be a maximum number of recently used dashboard descriptors 402 that may displayed on the dashboard selection GUI 400. For example, a maximum of nine dashboard descriptors 402 may be listed to provide a manageable number of dashboard options. Additionally or alternatively, the dashboard selection GUI 400 may display dashboard descriptors 402 that have been selected within a particular time frame. As an example, the dashboard selection GUI 400 may display dashboard descriptors 402 of dashboards 350 that have been selected within a predetermined time period, such as the past three months. Thus, when a dashboard 350 has not been selected in the past three months, the corresponding dashboard descriptors 402 may be removed from display on the dashboard selection GUI 400.

Figure 7:
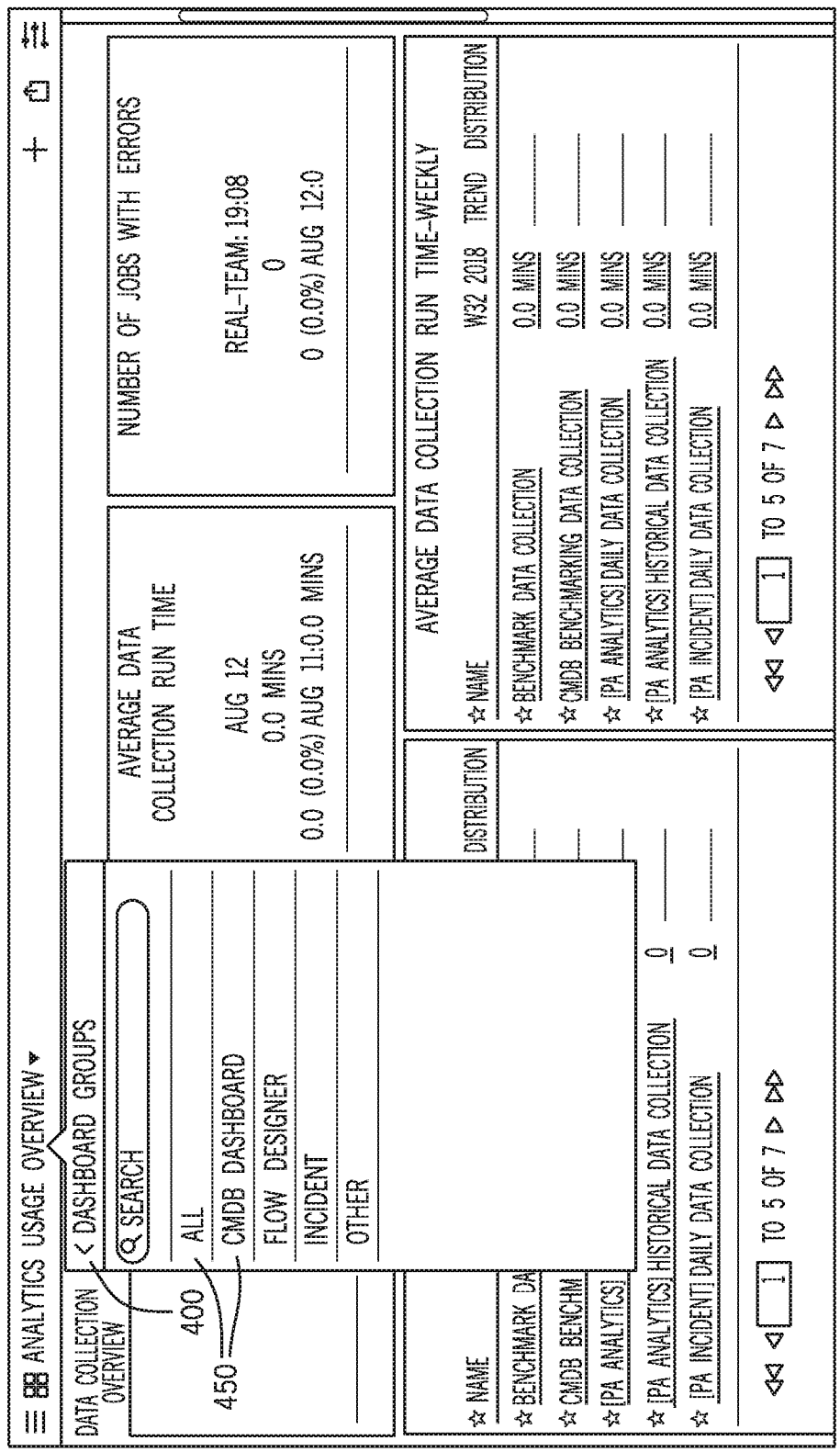
FIG. 7 is an embodiment of a GUI that may be used to select a dashboard via filtering by group, in accordance with aspects of the present disclosure.

The dashboard selection GUI 400 may enable the user to view other dashboard descriptors 402 as desired by the user. Specifically, the dashboard selection GUI 400 may include a dashboard group icon 404 that enables the user to view dashboard descriptors 402 of a particular group or category. FIG. 7 illustrates an embodiment of the dashboard 350 that includes the dashboard selection GUI 400 to enable the user to view dashboard descriptors 402 by groups, such as upon the user selecting the dashboard group icon 404. As an example, dashboards 350 may be associated with groups 450 based on information type, name, originating department or group, associated reports or tasks, and so forth. The dashboard selection GUI 400 may, thus, list groups 450 of dashboards 350 when selected. When the user selects a particular group 450, the dashboard selection GUI 400 may display at least a portion of the dashboards 350 associated with the particular group 450 as dashboard descriptors 402.

Additionally or alternatively, upon selecting a particular group 450, the dashboard selection GUI 400 may display subset categories of the group 450 that may further narrow the dashboard descriptors 402 displayed on the dashboard selection GUI 400. For example, the user may select an incident type group, and further an open incident type group 450, and even further a chart group 450 to view dashboards 450 that primarily use charts to illustrate information associated with open incidents. In this manner, the user may navigate the dashboard selection GUI 400 and browse dashboard descriptors 402 of a specifically desired group 450. As a result, dashboards 350 may be provided to the user based on the group 450 selected by the user.

The user may be able to select multiple groups 450, such as multiple information types, to view dashboard descriptors 402 associated with different groups 450. The user may also be able to view dashboards 350 of all categories, which may subsequently result in displaying descriptors for all available dashboards 350. In this manner, the listing of all available dashboards 350 on the dashboard selection GUI 400 is enabled as an option selected by the user instead of by default upon initiating the dashboard selection GUI 400.

When a group 450 is selected, the dashboard descriptors 402 pertaining to the group 450 may be organized and displayed on the dashboard selection GUI 400 alphabetically, based on recency, or in accordance with some other suitable sort criterion. Thus, the user may navigate through the dashboard selection GUI 400 after selecting the group 450 to search for dashboard descriptors 402 in an organized manner. However, the user may also organize the dashboard descriptors 402 in a different manner after filtering the dashboard descriptors 402 by the group 450.

FIG. 7 illustrates that, when the dashboard group icon 404 is selected, the dashboard selection GUI 400 of FIG. 7 replaces the dashboard selection GUI 400 of FIG. 6. However, in additional or alternative embodiments, selecting the dashboard group icon 404 may display (e.g., overlay on the dashboard selection GUI 400) a separate GUI in addition to the dashboard selection GUI 400. In other words, when the user selects the dashboard group icon 404, two separate GUIs may be displayed: one of which may be substantially similar to the dashboard selection GUI 400 of FIG. 6 and the other may be substantially similar to the dashboard selection GUI 400 of FIG. 7. In this manner, the user may use the separate GUIs to view both a list of dashboard descriptors 402 and a list of groups 450 simultaneously. In general, separate GUIs may enable the user to view multiple items of information regarding the dashboard descriptors 402 for easier navigation of the dashboard selection GUI 400.

Figure 8:
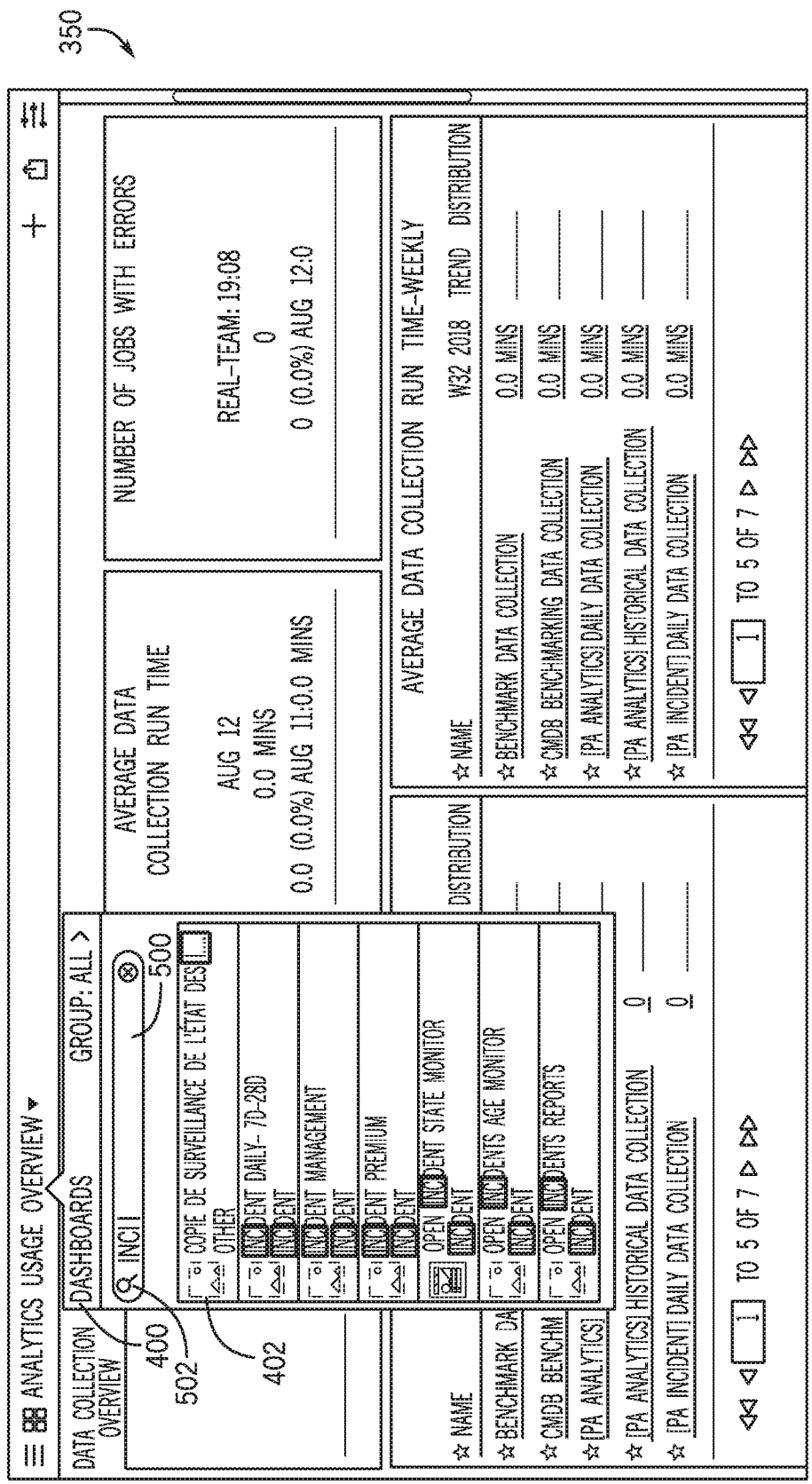
FIG. 8 is an embodiment of a GUI that may be used to select a dashboard via a search, in accordance with aspects of the present disclosure.

The user may also use the dashboard selection GUI 400 to search for particular dashboard descriptors 402 via text inputs. FIG. 8 illustrates an embodiment of the dashboard 350 that includes the dashboard selection GUI 400 enabling the user to input text in a search box 500. The dashboard descriptors 402 displayed on the dashboard selection GUI 400 may be based at least in part on the text input into the search box 500, such as by matching the information inputted by the user and information associated with the available dashboard, to enable the user to locate and select the desired dashboard 350 after text input, such as from a returned set of search results. In some embodiments, the text input may be matched with names of dashboard descriptors 402 that include at least a portion of the text input or based upon key words or other metadata associated with the dashboards. However, it should be appreciated that the text input may also be matched with categories of dashboard descriptors 402 that include at least a portion of the text input, such as a type of dashboard and/or a description of the dashboard.

In some embodiments, the dashboard descriptors 402 displayed on the dashboard selection GUI 400 may update in real time while the user inputs texts into the search box 500. In other words, the dashboard descriptors 402 displayed on the dashboard selection GUI 400 are updated as additional text is input by the user. In additional or alternative embodiments, the dashboard descriptors 402 displayed on the dashboard selection GUI 400 may update after prompting by a user (e.g., by selecting a search icon 502)

In further embodiments, the user may be able to search within a particular group 450 of dashboard descriptors 402. That is, the user may select a group 450 and subsequently, may input text in the search box 500. The dashboard selection GUI 400 may then display dashboard descriptors 402 that include information matching the text input and also pertain to the group 450. Thus, the user may narrow the text input to search dashboard descriptors 402 associated with certain groups 450.

The dashboard selection GUI 400 may include additional information and/or features to enable easier navigation by the user to select a particular dashboard 350. For example, the dashboard selection GUI 400 may display a total number of dashboard descriptors 402 provided to enable the user to determine if further navigating and/or searching to narrow a number of listed dashboards 350 may be beneficial to find a particular dashboard 350. Furthermore, to avoid displaying too many dashboard descriptors 402 simultaneously, which may impact the user's ease in navigating the dashboard selection GUI 400, the dashboard selection GUI 400 may display a limited number of dashboard descriptors 402 viewable to the user at a time. As an example, the dashboard selection GUI 400 may display a maximum of seventy dashboard descriptors 402 at a time and the user may navigate the dashboard selection GUI 400 to view a different set of seventy dashboard descriptors 402.

Figure 9:
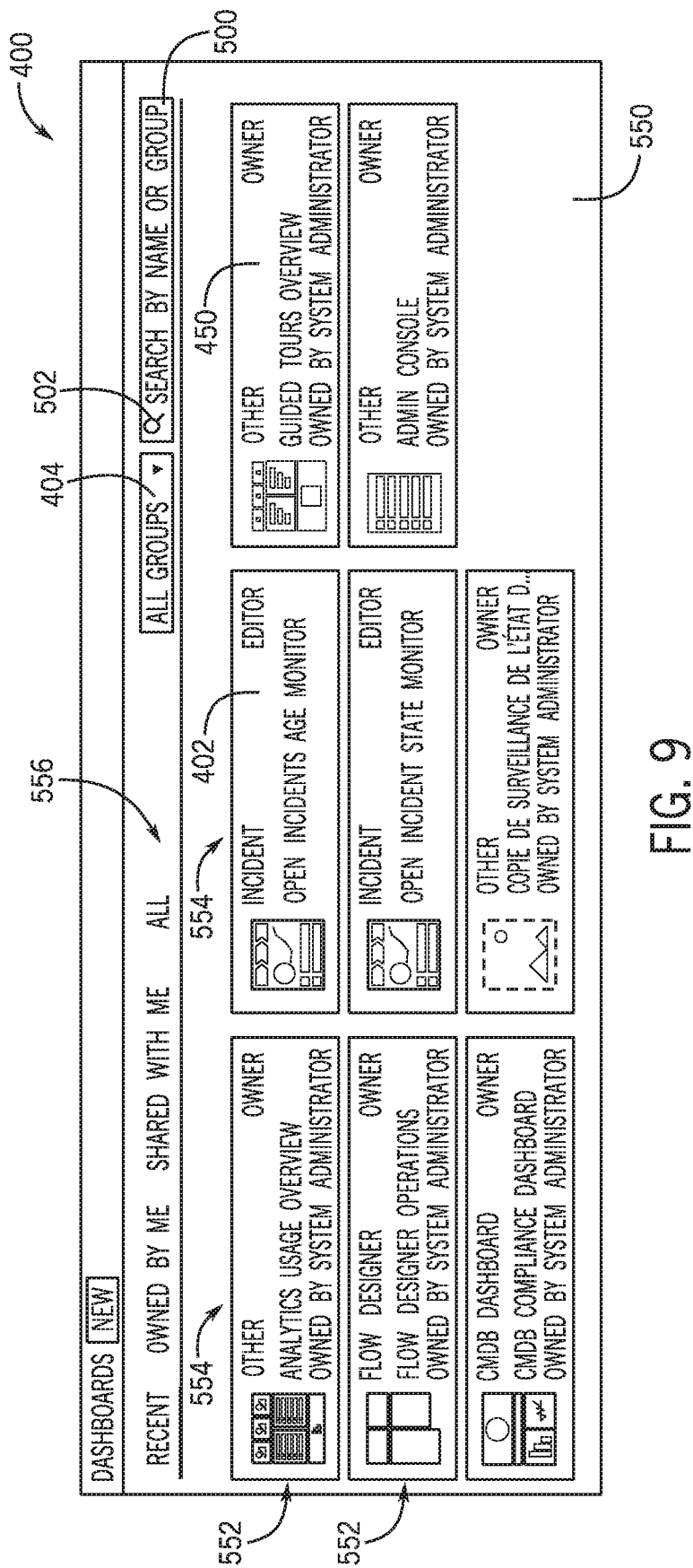
FIG. 9 is an embodiment of a GUI that may be used to select a dashboard, in accordance with aspects of the present disclosure.

It should be appreciated that the dashboard selection GUI 400 may be displayed in a different manner than depicted in FIGS. 6-8. As an example, FIG. 9 illustrates an embodiment of the dashboard selection GUI 400 that may be navigated from the dashboard 350 instead of being overlaid on top of the dashboard 350. That is, when the user selects one of the dashboard icons 368, the user may navigate from the dashboard 350 to the dashboard selection GUI 400. The illustrated embodiment of the dashboard selection GUI 400 of FIG. 9 may include substantially the same features of the dashboard selection GUI 400 of FIGS. 6-8, such as the dashboard group icon 404, the search box 500, and/or the search icon 502. As such, the dashboard selection GUI 400 of FIG. 9 may also enable the user to search dashboard descriptors 402 by category and/or via text input.

A center section 550 of the dashboard selection GUI 400 may include the dashboard descriptors 402 and/or the groups 450. That is, in certain embodiments, when the dashboard group icon 404 is selected, the groups 450 are displayed in the center section 550. In additional or alternative embodiments, the dashboard descriptors 402 may be displayed in the center section 550 and include information associated with the corresponding dashboards 350. As illustrated in FIG. 9, the dashboard descriptors 402 and/or the groups 450 may be organized in rows 552 and/or columns 554 in the center section 550. In particular embodiments, the position of the dashboard descriptors 402 and/or groups 450 in the center section 550 may be based on information associated with the dashboard descriptors 402 and/or groups 450. In one example, the groups 450 may be positioned alphabetically by column or row. In an additional example, the dashboard descriptors 402 may be positioned in each column based on the information type associated with the dashboard record 402, and further positioned in each row alphabetically. The dashboard selection GUI 400 may also enable the user to adjust (e.g., drag and drop) the respective positions of the dashboard descriptors 402 within the center section 550 as desired by the user.

In some cases, the dashboard selection GUI 400 of FIG. 9 may be larger in size than the dashboard selection GUI 400 of FIGS. 6-8 and thus, more information may be included in the dashboard selection GUI 400. For example, the dashboard selection GUI 400 of FIG. 9 may include additional dashboard control icons 556. The dashboard control icons 556 may enable the user to perform additional actions regarding the dashboards 350. By way of example, the user may select the dashboard control icons 556 to adjust how the dashboard descriptors 402 and/or groups 450 are displayed in the center section 550. In additional or alternative embodiments, the user may select the dashboard control icons 556 to limit which category of dashboard descriptors 402 and/or groups 450 are displayed in the center section 550.

Indeed, in a sample embodiment, the dashboard controls icons 556 may be indicative of an accessibility status of dashboard descriptors 402. That is, the dashboard control icons 556 may include categories that indicate if the dashboard record 402 is owned by the user, shared with the user, and so forth. Thus, the displayed dashboard descriptors 402 may be based on the selection of the dashboard group icon 404 and also by the dashboard controls icons 556 (e.g., dashboard descriptors 402 associated with open incidents and are owned by the user).

Both the embodiment of the dashboard selection GUI 400 of FIGS. 6-8 and the embodiment of the dashboard selection GUI 400 of FIG. 9 may be accessed by the user based on the selection of the dashboard icons 368. In this manner, the user may use the overlaid dashboard selection GUI 400 of FIGS. 6-8 (e.g., for quicker navigation) or to use the dashboard selection GUI 400 of FIG. 9 (e.g., for better control and visualization) as desired.

The disclosed subject matter may, in some embodiments, be employed in client instances that support access to a cloud-based application to select a dashboard, such as via a client device, though other implementations are also envisioned. In one such implementation, when a user of a client device accesses a cloud-based application, a subset of dashboards are initially listed as available for selection. Specifically, the cloud-based application determines if the user has access to each dashboard of the subset of dashboards and, in response to determining the user does have access to a dashboard, displays the dashboard on the client device. The subset of dashboards may be based on recent usage by the user, in which a limited number of recently used dashboards are listed. In this manner, less resources are consumed when accessing the cloud-based application relative to providing all available dashboards. Additionally, the user may use the cloud-based application to search for particular dashboards and the cloud-based application may provide the dashboards based on the search. In any case, the user may select a dashboard from the listed dashboards, where the selected dashboard is displayed on the client device.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a client instance hosted by a platform and supporting access by a plurality of client devices, each associated with a different respective user, wherein the client instance supports application and data access on one or more remote client networks, wherein the client instance comprises at least one respective dedicated application server and at least one respective dedicated database server, and wherein the system is configured to perform operations comprising:
on a client device of the plurality of client devices in communication with the client instance:
determining if a user possesses access to one or more dashboards of a plurality of dashboards associated with the client instance, wherein each dashboard of the plurality of dashboards comprises one or more visualizations of analytic or summary information of one or more applications implemented on the client instance by the at least one respective dedicated application server and accessed by the plurality of client devices, and wherein each dashboard of the plurality of dashboards is associated with a dashboard descriptor of a plurality of dashboard descriptors;
receiving, via the client device, a selection to display the one or more dashboards of the plurality of dashboards accessible by the user on the client device;
displaying a subset of the plurality of dashboard descriptors, each corresponding to a respective dashboard of the plurality of dashboards, on the client device based on a filtering criterion in response to receiving the selection to display the one or more dashboards;
receiving a selection of a displayed dashboard descriptor corresponding to a selected dashboard; and
displaying the selected dashboard on the client device.

2. The system of claim 1, wherein the filtering criterion is based on a recent usage history.

3. The system of claim 2, wherein the subset of the plurality of dashboards descriptors comprises nine or fewer dashboard descriptors available for selection.

4. The system of claim 1, wherein the filtering criterion is based on a user input.

5. The system of claim 4, wherein the user input comprises a selection of a category or grouping of dashboards.

6. The system of claim 1, wherein the operations comprise receiving a text input and matching the text input with information associated with each respective dashboard to identify a dashboard of the one or more dashboards for display on the client device.

7. The system of claim 1, wherein the operations comprise receiving an indication to display all available dashboard descriptors and displaying each of the one or more dashboards on the client device in response to receiving the indication.

8. The system of claim 1, wherein displaying each dashboard descriptor of the plurality of dashboard descriptors comprises displaying an image of each associated dashboard, a category of each associated dashboard, a name of each associated dashboard, or any combination thereof.

9. A system, comprising:
a client instance hosted by a platform and supporting access by a plurality of client devices, wherein the client instance supports application and data access on one or more remote client networks, wherein the client instance comprises at least one respective dedicated application server and at least one respective dedicated database server, and wherein the system is configured to perform operations comprising:
determining if a user possesses access to one or more dashboards of a plurality of dashboards associated with the client instance, wherein the client instance is accessed by a plurality of users including the user, wherein each dashboard of the plurality of dashboards comprises one or more visualizations of analytic or summary information related to one or more applications implemented on the client instance by the at least one respective dedicated application server, and wherein each dashboard of the plurality of dashboards is associated with a dashboard descriptor of a plurality of dashboard descriptors;
receiving, via a client device used by the user and in communication with the client instance, a selection to display the one or more dashboards of the plurality of dashboards accessible by the user on the client device;

displaying a subset of the plurality of dashboard descriptors, each associated with a dashboard of the plurality of dashboards, on the client device based on a filtering criterion in response to receiving the selection to display the plurality of dashboards;

receiving, via the client device, a selection of a displayed dashboard descriptor corresponding to a selected dashboard; and displaying the selected dashboard on the client device.

10. The system of claim 9, wherein the filtering criterion is based on a recent usage, wherein the recent usage comprises a selection via the user within a predetermined time period.

11. The system of claim 9, wherein the filtering criterion is based on a text input via the user, a category selection via the user, or both.

12. The system of claim 9, wherein the subset of the plurality of dashboard descriptors comprises seventy or fewer dashboard descriptors.

13. The system of claim 9, wherein the operations comprise not displaying a dashboard descriptor on the client device in response to determining the user does not possess access to a dashboard of the plurality of dashboards associated with the dashboard descriptor.

14. The system of claim 9, wherein displaying the plurality of dashboard descriptors on the client device comprises displaying dashboard information associated with each dashboard descriptor of the plurality of dashboard descriptors.

15. The system of claim 14, wherein dashboard information comprises a dashboard name, an dashboard image, a dashboard type, a dashboard accessibility status, or any combination thereof.

16. A system, comprising:
a client instance hosted by a platform and supporting access by a plurality of client devices associated with a plurality of users of the client instance, wherein the client instance supports application and data access on one or more remote client networks, wherein the client instance comprises at least one respective dedicated application server and at least one respective dedicated database server, wherein the client instance is communicatively coupled to the plurality of client devices to enable access to a respective plurality of dashboards of the client instance, and wherein the system is configured to perform operations comprising:

determining if a user possesses access to one or more dashboards of a plurality of dashboards associated with the client instance, wherein each dashboard of the plurality of dashboards comprises one or more visualizations of analytic or summary information of one or more applications implemented on the client instance by the at least one respective dedicated application server and accessed by the plurality of client devices, and wherein each dashboard of the plurality of dashboards is associated with a dashboard descriptor of a plurality of dashboard descriptors;

receiving, via a graphical user interface (GUI) of a client device of the plurality of client devices in communication with the client instance, a selection to display the one or more dashboards of the plurality of dashboards accessible by the user on the client device;

displaying, on the GUI, a subset of the plurality of dashboard descriptors, each corresponding to a respective dashboard of the client instance, based on a filtering criterion in response to receiving the selection to display the plurality of dashboards;

receiving, via the GUI, a selection of a displayed dashboard descriptor corresponding to a selected dashboard; and displaying the selected dashboard on the client device.

17. The system of claim 16, wherein the filtering criterion is a first filtering criterion, wherein the operations comprise receiving a second filtering criterion, and wherein the operations comprise displaying a subset of the plurality of dashboard descriptors based on the second filtering criterion.

18. The system of claim 17, wherein the first filtering criterion comprises a recent usage history and wherein the second filtering criterion comprises a user input.

19. The system of claim 18, wherein the GUI comprises a search box, a category icon, or both, wherein the second filtering criterion is based on a text input in the search box, a selection of the category icon, or both.

* * * * *